United States Patent
Ichiki (10) Patent No.: US 9,606,570 B2
(45) Date of Patent: Mar. 28, 2017

(54) MANIPULATOR DEVICE

(75) Inventor: Shunsuke Ichiki, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 436 days.

(21) Appl. No.: 14/237,749

(22) PCT Filed: Aug. 1, 2012

(86) PCT No.: PCT/JP2012/069568
§ 371 (c)(1),
(2), (4) Date: Jun. 9, 2014

(87) PCT Pub. No.: WO2013/021890
PCT Pub. Date: Feb. 14, 2013

(65) Prior Publication Data
US 2014/0298942 A1    Oct. 9, 2014

(30) Foreign Application Priority Data

Aug. 8, 2011  (JP) .................................. 2011-173040

(51) Int. Cl.
*G05G 9/047* (2006.01)
*G06F 3/0338* (2013.01)

(52) U.S. Cl.
CPC .......... *G05G 9/047* (2013.01); *G06F 3/0338* (2013.01); *Y10T 74/20201* (2015.01)

(58) Field of Classification Search
CPC ......... G05G 9/047; G05G 2009/04714; G05G 2009/04718; G05G 2009/04748; G05G 2009/0477
See application file for complete search history.

(56) References Cited

U.S. PATENT DOCUMENTS 4,857,881 A  *  8/1989  Hayes .................... G05G 9/047
                                              338/128
5,619,195 A  *  4/1997  Allen ...................... G05G 9/047
                                              200/6 R (Continued)

FOREIGN PATENT DOCUMENTS

JP    50-25591    8/1975
JP    53-79336    7/1978

(Continued)

OTHER PUBLICATIONS

International Search Report for corresponding PCT/JP2012/069568, dated Sep. 25, 2012. English translation provided.

*Primary Examiner* — William Kelleher
*Assistant Examiner* — Jake Cook
(74) *Attorney, Agent, or Firm* — Rossi, Kimms & McDowell LLP (57) ABSTRACT

A child unit (30) is configured to freely pivot about a first axial center (AX1) relative to a parent unit (10), and a grandchild unit (50) including a manipulator (56) is configured to freely pivot about a second axial center (AX2), which is orthogonal to the first axial center (AX1), relative to the child unit (30). A first rotary volume (32) is configured to detect a relative pivot amount of the parent unit (10) and the child unit (30) about the first axial center (AX1), and a second rotary volume (39) is configured to detect a relative pivot amount of the child unit (30) and the grandchild unit (50) about the second axial center (AX2). Both the first rotary volume (32) and the second rotary volume (39) are mounted to an electrical circuit board (43) of the child unit (30).

12 Claims, 8 Drawing Sheets (56) References Cited

U.S. PATENT DOCUMENTS

| | | | | |
|---|---|---|---|---|
| 5,655,411 | A * | 8/1997 | Avitan | G05G 9/047 74/471 XY |
| 6,504,115 | B2 * | 1/2003 | Nakai | G05G 9/047 200/6 A |
| 6,509,535 | B2 * | 1/2003 | Nakamura | G05G 9/047 200/335 |
| 2002/0105498 | A1 * | 8/2002 | Shimomura | G05G 9/047 345/161 |
| 2006/0066437 | A1 * | 3/2006 | Arai | H01C 3/16 338/128 |

FOREIGN PATENT DOCUMENTS

| | | |
|---|---|---|
| JP | 63-84903 U | 6/1988 |
| JP | 09-135965 A | 5/1997 |
| JP | 3381852 B2 | 12/2002 |
| JP | 2006-095234 A | 4/2006 |
| JP | 2006-131221 A | 5/2006 |

* cited by examiner

MANIPULATOR DEVICE

TECHNICAL FIELD

The present invention relates to a manipulator device including a first unit, a second unit configured to pivot about a first axial center relative to the first unit, and a third unit configured to pivot about a second axial center, which is non-parallel to the first axial center, relative to the second unit.

BACKGROUND ART

Hitherto, as an example of manipulator devices such as a joystick including three units, there has been known a manipulator device including a first unit, a second unit configured to pivot about a first axial center relative to the first unit, and a third unit configured to pivot about a second axial center, which is non-parallel to the first axial center, relative to the second unit.

For example, in the device disclosed in JP 3381852 B2, a joystick main body (second unit) is arranged on a base plate (first unit) in a freely rotatable manner, and a third unit including integrally movable grip portion, manipulating rod, guide stay, and finger rest is arranged on the joystick main body in a freely pivotable manner. An axial line in a rotational direction of the joystick main body and an axial line in a pivotal direction of the third unit are orthogonal to each other.

A rotational operation of the joystick main body with respect to the base plate is detected by a slide volume provided to the base plate. A pivotal operation of the third unit with respect to the joystick main body is detected by a rotary volume provided to the joystick main body.

SUMMARY OF INVENTION

In the configuration of the related-art device described above, when the base plate is regarded as a parent unit, the joystick main body as a child unit, and the third unit as a grandchild unit, the child unit freely pivots with respect to the parent unit, and the grandchild unit freely pivots with respect to the child unit.

However, the slide volume detects only a relative operation of the child unit with respect to the parent unit. Further, the rotary volume detects only a relative operation of the grandchild unit with respect to the child unit. Therefore, the operation of the child unit with respect to the parent unit is superimposed on the operation of the grandchild unit.

For this reason, in a concept of module design, an operation about the second axial center is regarded as being superimposed on an operation about the first axial center. As a result, the module design is unnecessarily complicated.

Further, arrangement of an electrical circuit board and wiring of signal lines depend on arrangement of the volumes for detecting pivot amounts. Thus, there is still room for improvement from the viewpoint of structural simplification.

The present invention has been made to solve the above-mentioned problems with the related art, and it is an object thereof to provide a manipulator device that enables relative pivot references of three units to be integrally grasped, and a design module to be simplified. Note that, in the following description of constituent elements of the present invention, for the sake of better understanding of the present invention, reference symbols of corresponding parts in the embodiment described below are added in parentheses. However, the constituent elements of the present invention should not be construed as being limited to the configuration of the corresponding parts denoted by the reference symbols in the embodiment.

In order to achieve the above-mentioned object, it is a feature of the present invention to provide a manipulator device, including: a first unit (10); a second unit (30) configured to freely pivot about a first axial center (AX1) relative to the first unit; a third unit (50) including a manipulator (56) and configured to freely pivot about a second axial center (AX2) relative to the second unit, the second axial center being non-parallel to the first axial center; a first detector (31, 32) configured to detect a relative pivot amount of the first unit and the second unit about the first axial center, the first detector being arranged in the second unit; and a second detector (38, 39) configured to detect a relative pivot amount of the second unit and the third unit about the second axial center, the second detector being arranged in the second unit.

In this case, the first axial center and the second axial center are, for example, orthogonal to each other. Further, the manipulator of the third unit is manipulated to pivot about the first axial center so as to pivot the second unit about the first axial center with respect to the first unit, and the manipulator of the third unit is manipulated to pivot about the second axial center so as to pivot the third unit about the second axial center with respect to the second unit.

Further, the first detector includes: a detector main body (32); and a rotary shaft (31) supported on the detector main body in a rotatable manner, and the first detector is configured to detect a rotation amount of the rotary shaft with respect to the detector main body. In addition, the second detector includes: a detector main body (39); and a rotary shaft (38) supported on the detector main body in a rotatable manner, and the second detector is configured to detect a rotation amount of the rotary shaft with respect to the detector main body. In this case, the first detector and the second detector are each formed of, for example, a rotary volume.

Further, it is preferred that the detector main body of the first detector be fixed to the second unit in a manner that the rotary shaft of the first detector is extended in a direction of the first axial center, that the detector main body of the second detector be fixed to the second unit in a manner that the rotary shaft of the second detector is extended in a direction of the second axial center, that the first unit support the second unit so that the second unit freely pivots about the first axial center by supporting, at one end in the direction of the first axial center, a pivot portion (33) provided integrally with the second unit so that the pivot portion freely pivots about the first axial center, and by fitting, at another end in the direction of the first axial center, the rotary shaft of the first detector to the first unit so that the rotary shaft of the first detector is non-rotatable about the first axial center, and that the second unit support the third unit so that the third unit freely pivots about the second axial center by supporting, at one end in the direction of the second axial center, a pivot portion (53) provided integrally with the third unit so that the pivot portion freely pivots about the second axial center, and by fitting, at another end in the direction of the second axial center, the rotary shaft of the second detector to the third unit so that the rotary shaft of the second detector is non-rotatable about the second axial center.

Further, it is preferred that the first unit support the second unit so as to be immovable in the direction of the first axial center, and that the second unit support the third unit so as to be immovable in the direction of the second axial center.

In the present invention configured as described above, both the first detector and the second detector are arranged in the second unit. Thus, relative pivot references of the first unit to the third unit can be integrally grasped, and hence a design module can be simplified.

Further, in the above-mentioned features of the present invention, it is preferred that the manipulator device further include: a first spring (35) locked to the first unit and driven by the second unit to apply a force of returning to an initial position to the second unit; and a second spring (46) locked to the second unit and driven by the third unit to apply a force of returning to an initial position to the third unit. With this, when a user cancels manipulation of the manipulator, the second unit and the third unit are automatically returned to the initial positions, respectively.

Further, the present invention has another feature in that the first detector and the second detector are mounted to a common electrical circuit board (43) arranged in the second unit. In this case, it is preferred that the common electrical circuit board be formed into an L-shape, and that the first detector and the second detector be respectively provided to extended portions of the L-shape of the common electrical circuit board. Further, it is preferred that the manipulator device further include a connector terminal portion (44) provided at a bent portion of the L-shape of the common electrical circuit board. With this, a configuration of the common electrical circuit board can be simplified.

Further, the present invention has another feature in that a signal line from the first detector and a signal line from the second detector are bundled into a single signal line bundle (45), which is led to an outside. With this, the signal line from the first detector and the signal line from the second detector can be bundled on an upstream side of a module to the extent possible, and hence the signal line bundle can be easily handled.

Further, the present invention has another feature in that the manipulator device further includes a conductive cover (70) provided as measures against EMC of the first detector and the second detector so as to cover the first detector and the second detector. With this, a configuration of the measures against EMC of the first detector and the second detector can be simplified.

DESCRIPTION OF EMBODIMENT

Figure 1:
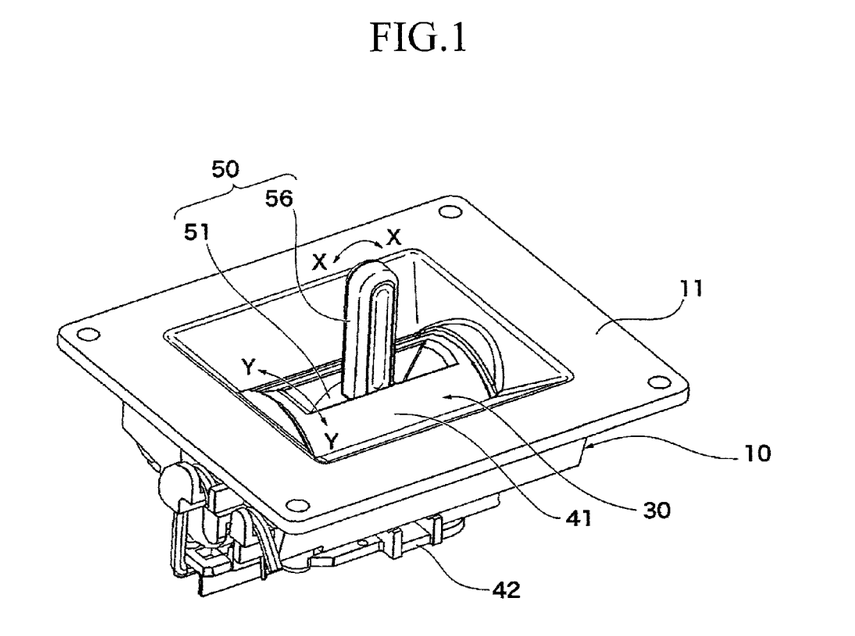
FIG. 1 is a perspective view of a manipulator device according to an embodiment of the present invention.

Now, description is made of an embodiment of the present invention with reference to the drawings. FIG. 1 is a perspective view of a manipulator device according to the embodiment of the present invention. This manipulator device serves, for example, as a joystick, and is suited to use, for example, as an input device for musical control of electronic musical instruments. Examples of objects to be controlled may include a tone pitch, a tone color, sound volume, and musical parameters relating to various effects such as vibrato and reverberation. Note that, use of the manipulator device is not limited to the musical control, and is applicable to electrical devices (such as a game device) other than the musical instruments.

This manipulator device is formed mainly of three units. Specifically, a parent unit 10 serving as a first unit, a child unit 30 serving as a second unit, and a grandchild unit 50 serving as a third unit are provided. The grandchild unit 50 freely pivots in an X direction relative to the child unit 30. The child unit 30 freely pivots in a Y direction relative to the parent unit 10. When assuming that the parent unit 10 serves as a fixed body that is fixed to an electrical device, the child unit 30 and the grandchild unit 50 serve as movable bodies.

A manipulator 56 is a component that is manipulated directly by an operator, and can be manipulated in the X direction and the Y direction, or directions having components in both of those directions in conjunction with movement of the grandchild unit 50 and/or the child unit 30. For example, when the manipulator 56 is manipulated in the direction having the component in the X direction, the grandchild unit 50 pivots in the X direction in conjunction therewith. When the manipulator 56 is manipulated in the direction having the component in the Y direction, in conjunction therewith, the child unit 30 pivots integrally with the grandchild unit 50 in the Y direction with respect to the parent unit 10.

The parent unit 10 includes an upper case 11, and the child unit 30 includes a wheel 41 and a lower frame 42 each made of a resin. The grandchild unit 50 includes the manipulator 56 and a cover body 51 that are formed separately from each other. The wheel 41 is provided integrally with the child unit 30, and serves as an external appearance member that is exposed to an outside. No other components of the child unit 30 than the wheel 41 serve as the external appearance member. Under a non-manipulation state, the manipulator 56 is projected with respect to the upper case 11. For the sake of convenience of the following description, it is assumed that the projecting direction of the manipulator 56 is an upward direction. Further, the units illustrated in the drawings referred to below are at initial positions, that is, under the non-manipulation state.

Figure 2:
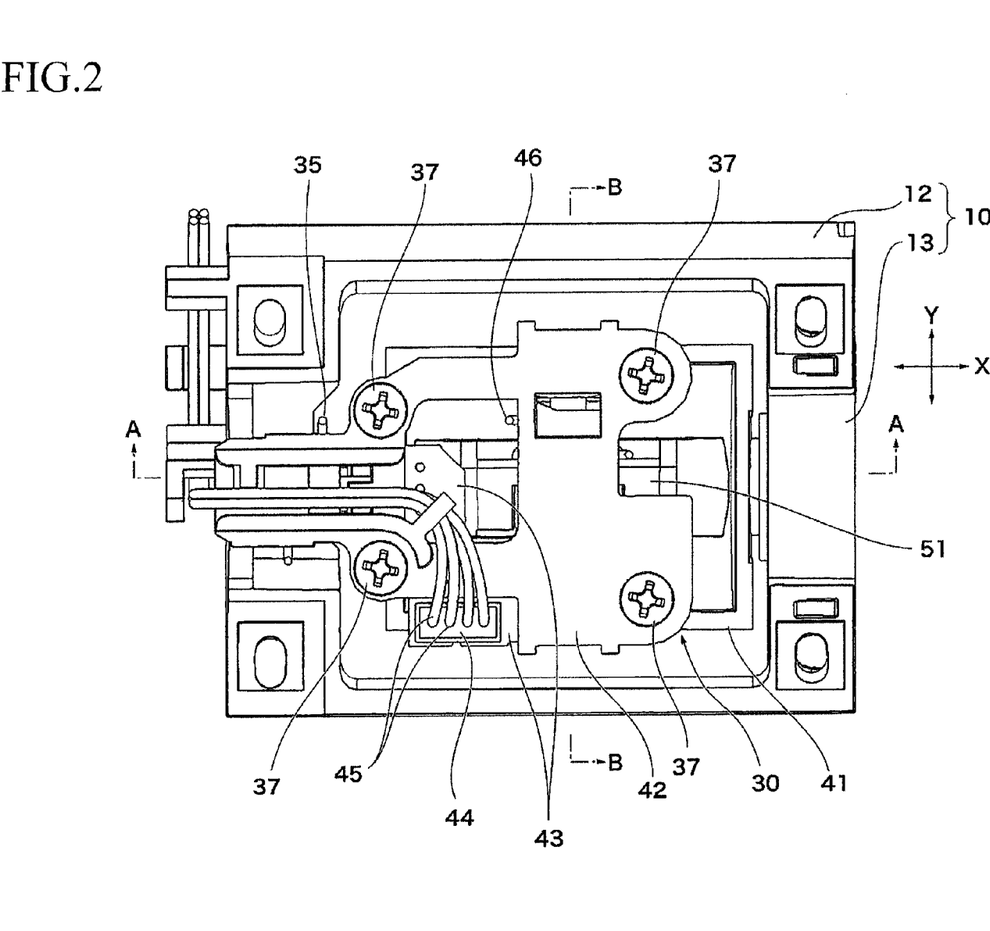
FIG. 2 is a bottom view of the manipulator device from which an upper case is removed.
Figure 3:
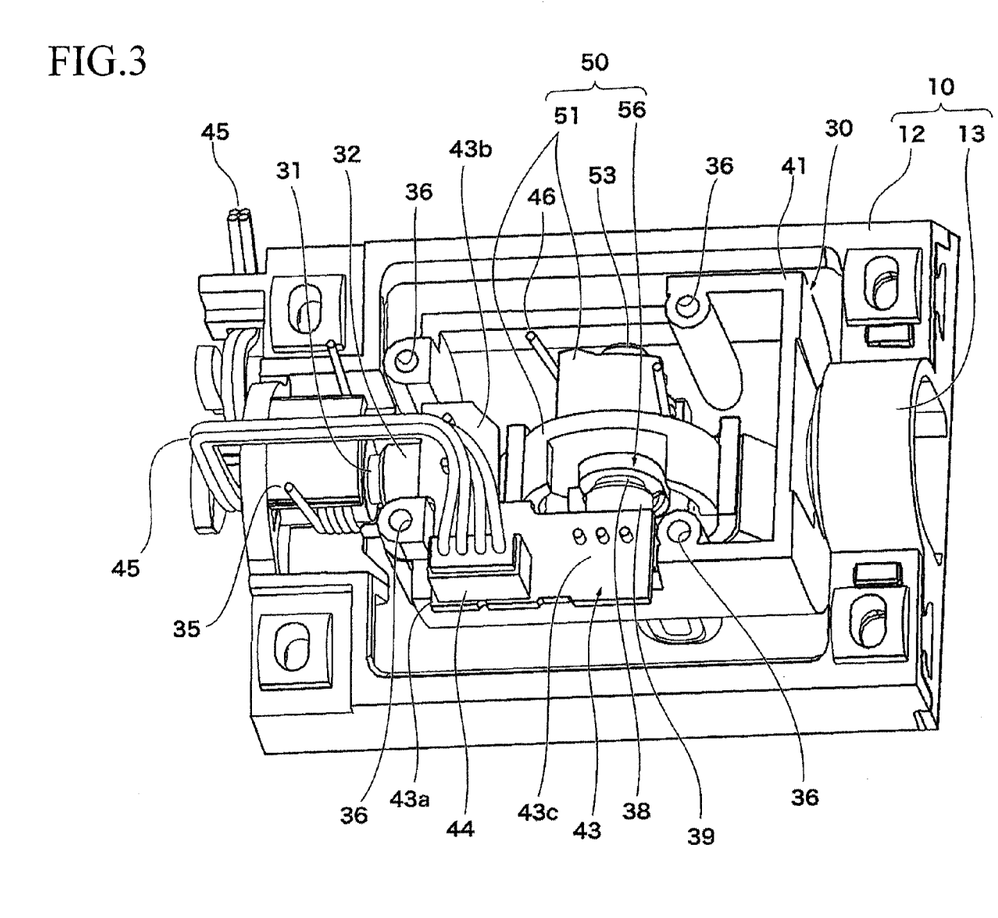
FIG. 3 is a perspective view of a bottom surface side of the manipulator device from which the upper case and a lower frame are removed.

FIG. 2 is a bottom view of the manipulator device from which the upper case 11 is removed. FIG. 3 is a perspective view of a bottom surface side of the manipulator device from which the upper case 11 and the lower frame 42 are removed. The parent unit 10 includes a large house 12 and a small house 13 each made of a resin as components thereof as well as the upper case 11, and those components integrally form the parent unit 10.

Figure 4:
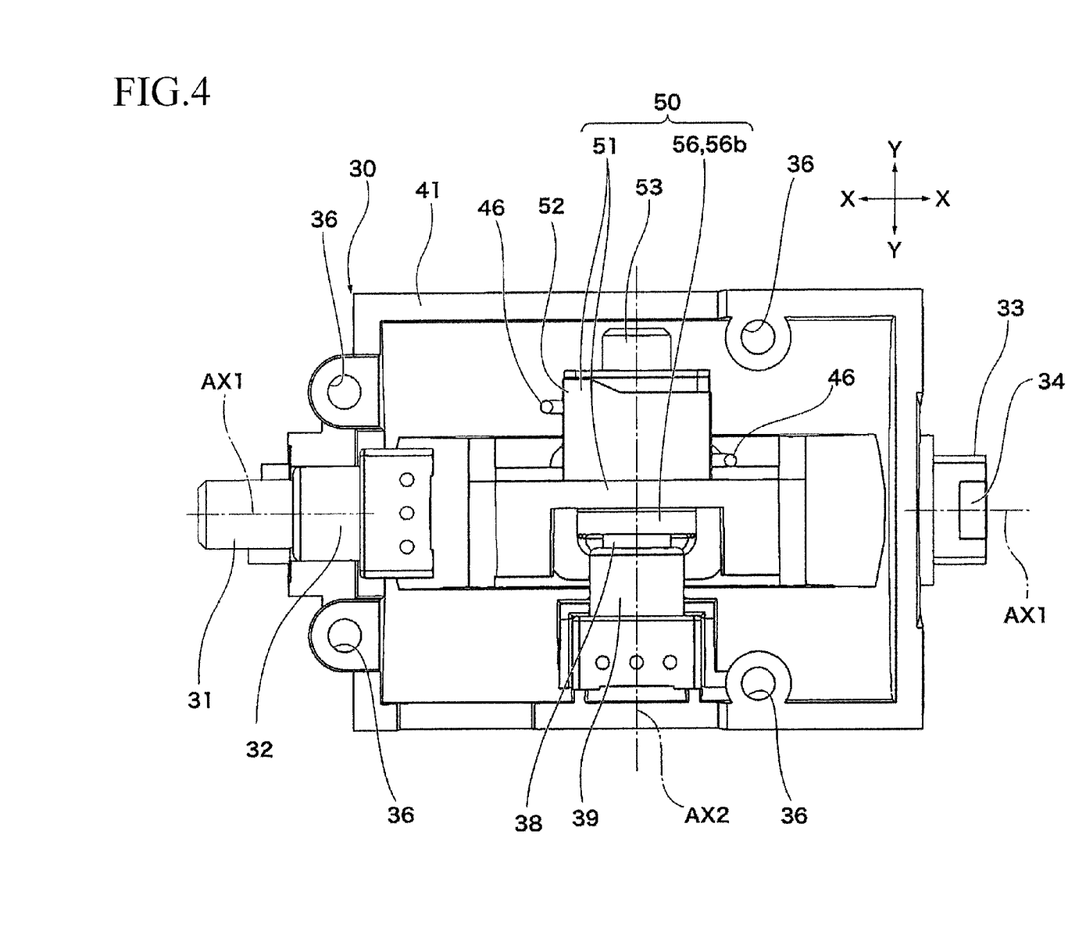
FIG. 4 is a bottom view of main components of a child unit and a grandchild unit.

FIG. 4 is a bottom view of the main components of the child unit 30 and the grandchild unit 50. In the child unit 30, the lower frame 42 is fixed with screws 37 (FIG. 2) through four mounting holes 36 formed in a lower portion of the wheel 41. In this way, the wheel 41 and the lower frame 42 are integrated with each other. An electrical circuit board 43 is firmly fixed to an upper surface of the lower frame 42 (FIGS. 2 and 3). The electrical circuit board 43 includes a bent portion 43a provided with arm portions (extended portions) extended in two directions that are orthogonal to each other from the bent portion 43a. In this way, the electrical circuit board 43 is formed substantially into an L-shape in bottom view (FIG. 3). A connector terminal portion 44 is mounted to the bent portion 43a (FIG. 3).

As illustrated in FIG. 4, the child unit 30 is provided with a first rotary volume 32 and a second rotary volume 39. Specifically, the first rotary volume 32 and the second rotary volume 39 are mounted respectively to distal end portions 43b and 43c (FIG. 3) of the two extended portions of the electrical circuit board 43. Then, signal lines from the first rotary volume 32 and the second rotary volume 39 are bundled into one at the connector terminal portion 44 on the bent portion 43a, and are led as a signal line bundle 45 to an outside of the device (FIGS. 2 and 3). With this, the signal lines are easily handled.

The first rotary volume 32 and the second rotary volume 39 respectively include housings that are fixed to the electrical circuit board 43, and a first rotary shaft 31 and a second rotary shaft 38 that are rotatable with respect to the housings, respectively. The housings of the first rotary volume 32 and the second rotary volume 39 are positioned and fixed in a manner that a first axial center AX1 of the first rotary shaft 31 of the first rotary volume 32 is orthogonal to the Y direction, and that a second axial center AX2 of the second rotary shaft 38 of the second rotary volume 39 is orthogonal to the X direction (FIG. 4). Thus, the first axial center AX1 and the second axial center AX2 are positioned fixedly with respect to the child unit 30. Note that, the first rotary volume 32 and the second rotary volume 39 correspond respectively to detector main bodies of a first detector and a second detector of the present invention, and the first rotary shaft 31 and the second rotary shaft 38 correspond respectively to rotary shafts of the first detector and the second detector of the present invention, which are supported on the detector main bodies in a rotatable manner, respectively.

The first rotary volume 32 detects a relative pivot amount in the Y direction of the parent unit 10 and the child unit 30 about the first axial center AX1. The second rotary volume 39 detects a relative pivot amount in the X direction of the child unit 30 and the grandchild unit 50 about the second axial center AX2. As long as the relative pivot amounts of the units can be detected based on rotations of the rotary shafts, sensors of the first rotary volume 32 and the second rotary volume 39 are not particularly limited in configuration.

As illustrated in FIG. 4, the child unit 30 includes a projecting shaft 33 provided to project from an end portion opposite to an end portion at which the first rotary volume 32 is arranged. The projecting shaft 33 is coaxial with the first axial center AX1. The projecting shaft 33 includes a distal end portion formed integrally with upper and lower flange portions 34.

Figure 5:
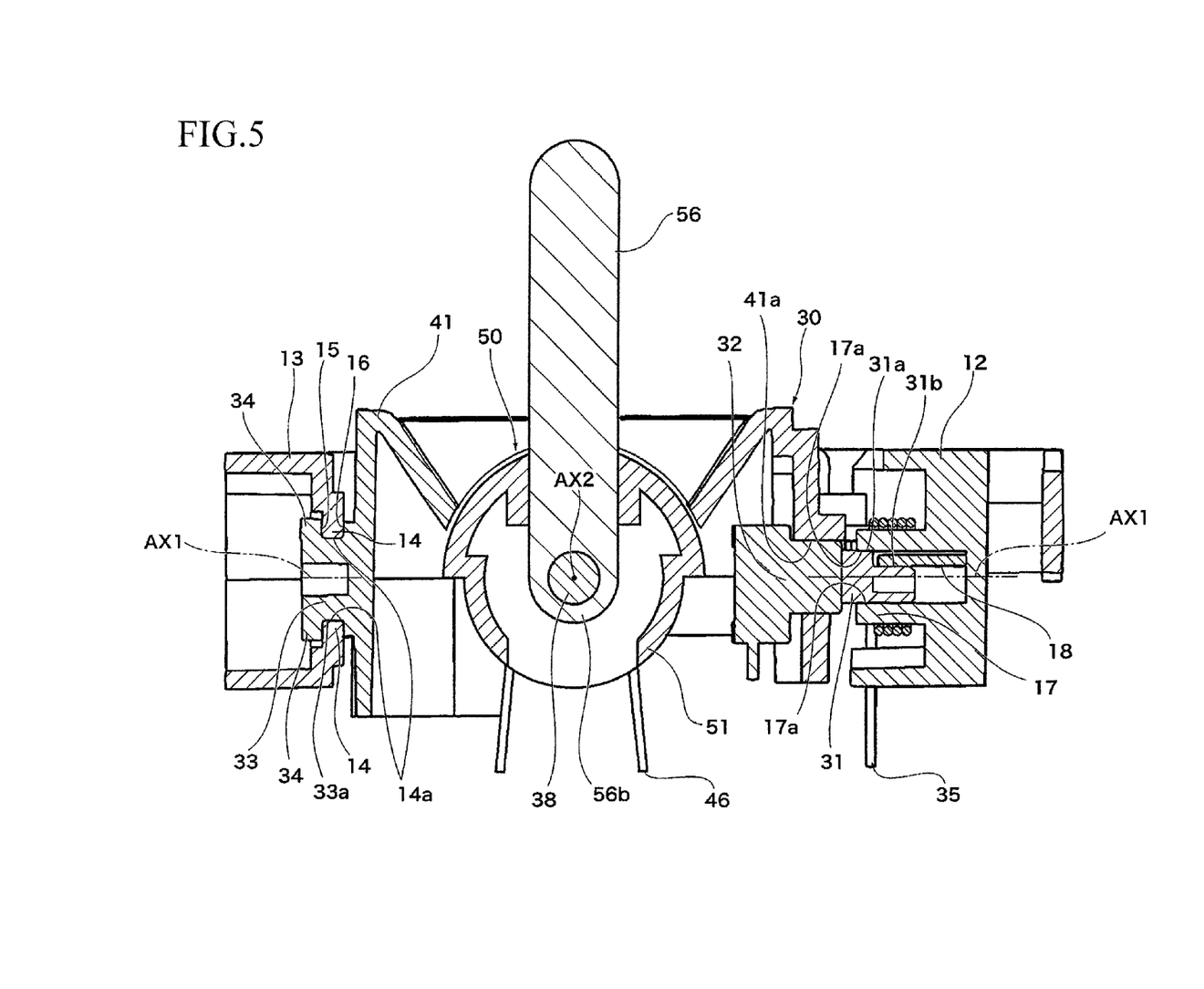
FIG. 5 is a sectional view taken along the line A-A of FIG. 2.

FIG. 5 is a sectional view taken along the line A-A of FIG. 2, in which the lower frame 42, the electrical circuit board 43, and the components mounted thereto are not illustrated.

The parent unit 10 and the child unit 30 are engaged with each other in a freely pivotable manner as follows. First, as illustrated in FIG. 5, a bearing surface 14a of a bearing portion 14 of the small house 13 of the parent unit 10 is fitted to an outer peripheral surface 33a of the projecting shaft 33 of the child unit 30 so that the projecting shaft 33 is axially supported on the bearing portion 14 to be pivotable about the first axial center AX1. At this time, the flange portions 34 can be engaged with the bearing portion 14 by inserting the flange portions 34 through the bearing portion 14 in a state of being rotated at a predetermined rotation angle with respect to the bearing portion 14, and then returning the flange portions 34 to a rotation angle as illustrated in FIG. 5. In this way, the outer peripheral surface 33a of the projecting shaft 33 is fitted on the bearing surface 14a between regulating surfaces 15 and 16 of the bearing portion 14. As a result, the child unit 30 is positioned with respect to the small house 13 in a direction (planar direction) that is orthogonal to the first axial center AX1, and also in a direction that is parallel to the first axial center AX1. Note that, the projecting shaft 33 corresponds to a pivot portion provided integrally with the second unit (that is, child unit 30) of the present invention. This pivot portion is supported by the bearing portion 14 of the first unit (that is, parent unit 10) of the present invention so as to be pivotable about the first axial center AX1. With this, the second unit is supported at one end in a direction of the first axial center AX1 so as to freely pivot about the first axial center AX1. Further, the second unit is supported at the one end in a direction of the first axial center AX1 by the first unit so as to be immovable in the direction of the first axial center AX1.

Meanwhile, the large house 12 of the parent unit 10 includes a cylindrical shaft portion 17 formed at an end portion opposite to a position of the bearing portion 14. An outer peripheral surface 31a of the first rotary shaft 31 of the first rotary volume 32 is inserted through and fitted to a bearing surface 17a that is an inner peripheral surface of the cylindrical shaft portion 17. With this, the first rotary shaft 31 is axially supported, and the child unit 30 is positioned with respect to the large house 12 in the direction (planar direction) that is orthogonal to the first axial center AX1.

The large house 12 and the small house 13 are fixed to each other with screws in a state of being positioned with respect to the child unit 30 as described above.

Further, the bearing surface 17a is provided with an inner thick portion 18, and the first rotary shaft 31 is provided with a cutout portion 31b so that the inner thick portion 18 is held in abutment against the cutout portion 31b. With this, when the child unit 30 pivots relative to the large house 12 of the parent unit 10, the inner thick portion 18 drives the cutout portion 31b, and the first rotary shaft 31 is pivoted in conjunction therewith. In other words, the first rotary shaft 31 of the first rotary volume 32 is fitted to the cylindrical shaft portion 17 and the inner thick portion 18 of the first unit (that is, parent unit 10) of the present invention so as not to be rotatable about the first axial center AX1. In this way, the first unit supports the second unit (that is, child unit 30) of the present invention at another end in a direction of the first axial center AX1. Note that, the first rotary shaft 31 is supported by the main body of the detector (first rotary volume 32) of the present invention, which is fixed to the second unit, so as to be rotatable about the first axial center AX1. Thus, the second unit itself is supported at the another end in a direction of the first axial center AX1 by the first unit so as to be rotatable about the first axial center AX1. In addition, the cylindrical shaft portion 17 has an outer peripheral surface on which a coil spring 35 is mounted. The coil spring 35 is locked to the large house 12, and driven in a direction in which the coil spring 35 is expanded by the lower frame 42 of the child unit 30. In this way, a force of returning to an initial position is applied to the child unit 30.

Figure 6:
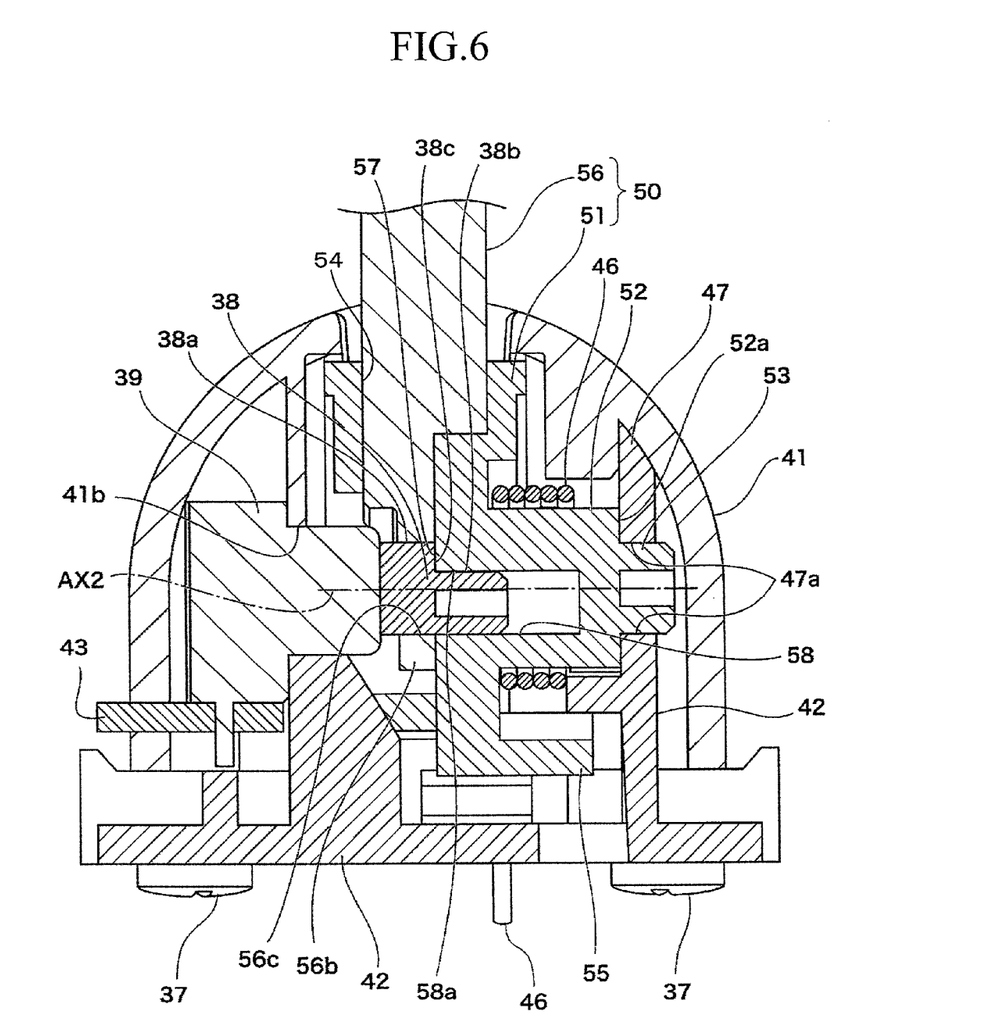
FIG. 6 is a sectional view taken along the line B-B of FIG. 2.

FIG. 6 is a sectional view taken along the line B-B of FIG. 2, in which the parent unit 10 is not illustrated. FIG. 7(a) is an exploded perspective view of the second rotary volume 39 and the grandchild unit 50, and FIG. 7(b) is a perspective view of the cover body 51.

The child unit 30 and the grandchild unit 50 are engaged with each other in a freely pivotable manner as follows. First, as illustrated in FIGS. 6 and 7(a), the second rotary shaft 38 of the second rotary volume 39 is provided with a cutout portion 38b, and an end surface 38c directed to a distal end of the second rotary shaft 38 is formed continuously with the cutout portion 38b.

As illustrated in FIG. 7(a), in the grandchild unit 50, the cover body 51 is formed of a single member made of a resin, and the manipulator 56 is formed of a single member made of rubber or a resin that is softer than that for the cover body 51. The manipulator 56 is formed into a bar shape, and mainly includes a distal end portion 56a that is manipulated, and a lower plate-like coupling portion 56b. The coupling portion 56b is provided with a shaft insertion hole 56c.

As illustrated in FIGS. 7(a) and 7(b), the cover body 51 is provided with an engagement hole 54 passing therethrough in a vertical direction. Further, as illustrated in FIG. 7(a), the cover body 51 is provided with a thick shaft 52 and a thin shaft 53 that are concentric with each other, and the thick shaft 52 has an outer peripheral surface on which a coil spring 46 is mounted. As illustrated in FIGS. 6 and 7(b), the thick shaft 52 is provided with a shaft insertion hole 58 that is concentric therewith, and the shaft insertion hole 58 is provided with an inner thick portion 58a.

As illustrated in FIG. 6, the manipulator 56 is inserted through the engagement hole 54 of the cover body 51. The manipulator 56 is fitted to the engagement hole 54 due to its elasticity. In this state, the second rotary shaft 38 of the second rotary volume 39 is inserted through the shaft insertion hole 56c of the manipulator 56 and the shaft insertion hole 58 of the cover body 51 (also refer to FIG. 5). With this, the shaft insertion hole 56c and the shaft insertion hole 58 are engaged with an outer peripheral surface 38a of the second rotary shaft 38, and the manipulator 56 and the cover body 51 are axially supported directly on the second rotary shaft 38. The cover body 51 covers a part (lower half) of the manipulator 56. Further, the thin shaft 53 is axially supported on a bearing surface 47a provided to a rib 47 of the lower frame 42 of the child unit 30 so as to be pivotable about the second axial center AX2. With this, the manipulator 56 and the cover body 51 are positioned with respect to the child unit 30 in a direction (planar direction) that is orthogonal to the second axial center AX2 of the second rotary shaft 38. Note that, the thin shaft 53 corresponds to a pivot portion provided integrally with the third unit (that is, grandchild unit 50) of the present invention. This pivot portion is supported by the bearing surface 47a of the second unit (that is, child unit 30) of the present invention so as to be pivotable about the second axial center AX2. With this, the third unit is supported at one end in a direction of the second axial center AX2 so as to freely pivot about the second axial center AX2.

Further, a perpendicular surface 57 (FIG. 7(b)) of the cover body 51 is held in abutment against the end surface 38c of the second rotary shaft 38, and an end surface 52a of the thick shaft 52 of the cover body 51 is held in abutment against the rib 47 of the lower frame 42. In this way, the cover body 51 is regulated in position in a direction that is parallel to the second axial center AX2. With this, the grandchild unit 50 is positioned with respect to the child unit 30 in the direction that is parallel to the second axial center AX2. In other words, the third unit (grandchild unit 50) is supported at the one end in a direction of the second axial center AX2 by the second unit (child unit 30) of the present invention so as to be immovable in the direction of the second axial center AX2.

By the way, in order to position the first rotary volume 32 in the child unit 30 (to position the first rotary shaft 31 in a radial direction), an outer surface of the housing of the first rotary volume 32 may be received in a first semicircular recessed surface 41a (refer to FIG. 5) of the wheel 41 of the child unit 30 so that the first semicircular recessed surface 41a is used for the positioning. Similarly, in order to position the second rotary volume 39 in the child unit 30 (to position the second rotary shaft 38 in a radial direction), an outer surface of the housing of the second rotary volume 39 may be received in a second semicircular recessed surface 41b (refer to FIG. 6) of the wheel 41 so that the second semicircular recessed surface 41b is used for the positioning.

Figure 7:
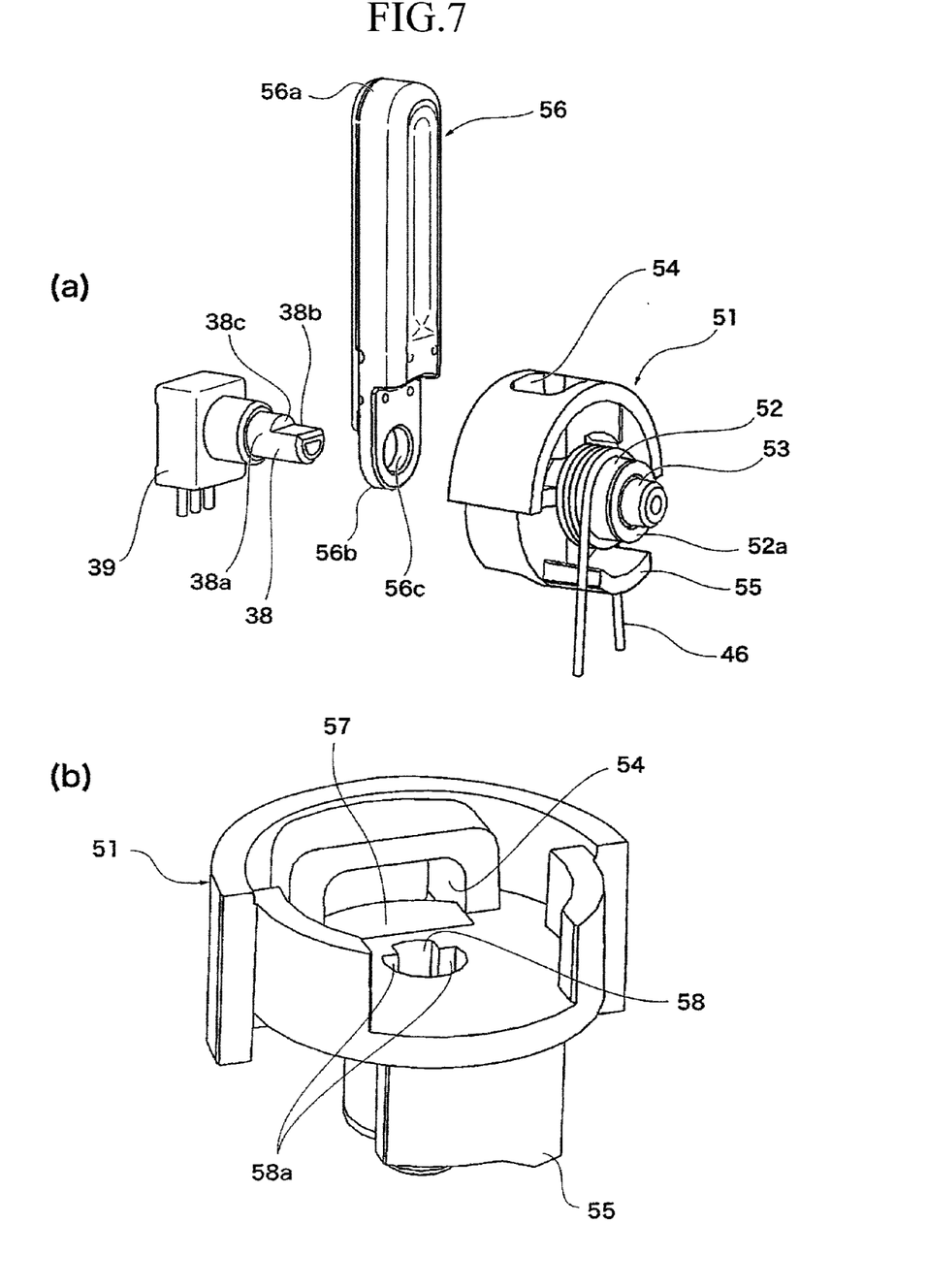
FIG. 7 are an exploded perspective view of a second rotary volume and the grandchild unit, and a perspective view of a cover body.

The inner thick portion 58a of the shaft insertion hole 58 of the cover body 51 is held in abutment against the cutout portion 38b of the second rotary shaft 38 of the second rotary volume 39. When the grandchild unit 50 pivots relative to the child unit 30, the inner thick portion 58a drives the cutout portion 38b, and the second rotary shaft 38 is pivoted in conjunction therewith. In other words, the second rotary shaft 38 of the second rotary volume 39 is fitted to the shaft insertion hole 58 and the inner thick portion 58a of the third unit (that is, grandchild unit 50) so as not to be rotatable about the second axial center AX2. In this way, the second unit (that is, child unit 300) of the present invention supports the third unit of the present invention at another end in a direction of the second axial center AX2. Note that, the second rotary shaft 38 is supported by the main body of the detector (second rotary volume 39) of the present invention, which is fixed to the second unit, so as to be rotatable about the second axial center AX2. Thus, the third unit itself is supported at the another end in a direction of the second axial center AX2 by the second unit so as to be rotatable about the second axial center AX2. In addition, the outer peripheral surface of the thick shaft 52 of the cover body 51 has the coil spring 46 mounted thereon. The coil spring 46 is locked to the lower frame 42, and driven in a direction in which the coil spring 46 is expanded by a drive portion 55 of the cover body 51 (FIGS. 6 and 7). In this way, a force of returning to an initial position is applied to the grandchild unit 50.

When the manipulator 56 is manipulated to pivot about the second axial center AX2 (in the X direction), a manipulation force thereof is transmitted to the cover body 51 through intermediation of the engagement hole 54. With this, the cover body 51 and the manipulator 56 move integrally with each other, and the grandchild unit 50 pivots about the second axial center AX2 with respect to the child unit 30. Further, when the manipulator 56 is manipulated to pivot about the first axial center AX1 (in the Y direction), not only the cover body 51 but also the child unit 30 move integrally with the grandchild unit 50. With this, the grandchild unit 50 and the child unit 30 pivot about the first axial center AX1 with respect to the parent unit 10. The manipulator 56 is allowed to pivot also about the first axial center AX1 and the second axial center AX2 in combination.

According to this embodiment, both the first rotary volume 32 and the second rotary volume 39 are arranged in the child unit 30. Thus, relative pivot references of the three units can be integrally grasped, and hence a design module can be simplified. In particular, accumulation of errors can be suppressed, and hence detection accuracy can be enhanced.

Further, the first rotary volume 32 and the second rotary volume 39 are mounted to the common electrical circuit board 43, and hence electrical signals from the first rotary volume 32 and the second rotary volume 39 can be integrated on a single board. As a result, the configuration of the electrical circuit board 43 can be simplified. In particular, the electrical circuit board 43 is formed into an L-shape, and the signal lines from the first rotary volume 32 and the second rotary volume 39 are led as the single signal line bundle 45 to the outside. In this way, the signal lines can be bundled on an upstream side of the module to the extent possible, and hence can be easily handled.

Further, according to this embodiment, the first axial center AX1 and the second axial center AX2 are fixedly positioned with respect to the child unit 30. In addition, the large house 12 and the small house 13 that are provided integrally with the parent unit 10 are assembled to the first rotary shaft 31 and the projecting shaft 33 that are coaxial with the first axial center AX1, and positioned directly in the direction that is orthogonal to the first axial center AX1 (FIG. 5). Further, the cover body 51 and the manipulator 56 that are provided integrally with the grandchild unit 50 are assembled to the second rotary shaft 38 that is coaxial with the second axial center AX2, and positioned directly in the direction that is orthogonal to the second axial center AX2 (FIG. 6). In other words, the cover body 51 and the manipulator 56 are axially supported directly on the second rotary shaft 38 so as to freely pivot about the second axial center AX2 relative to the child unit 30.

In this way, in positional relationships between the parent unit 10, the child unit 30, and the grandchild unit 50, those units can be positioned directly with respect to each other on a two-axis basis. Thus, accumulation of errors can be suppressed, and hence positioning can be performed with accuracy. As a result, products can be assembled with higher accuracy, and in addition, gaps can be narrowed while reducing a risk of abrasion at movable parts. With this, advantages of preventing entry of foreign matter or static electricity, preventing injury, achieving downsizing, and the like are obtained. Further, those units are axially supported directly, and hence can be increased in strength. In addition, the manipulator 56 can be increased in strength and positioned with accuracy, and hence advantages of better manipulation feeling and manipulation property are obtained as well.

With regard to the child unit 30, a pair of the first rotary shaft 31 and the projecting shaft 33 and the second rotary shaft 38, which are non-parallel to each other, are fixed to the child unit 30. In addition, the wheel 41, which is the only external appearance member provided integrally with the child unit 30, is positioned directly around the first rotary shaft 31 with respect to the direction that is orthogonal to the axial center AX1, and directly also around the second rotary shaft 38 with respect to the direction that is orthogonal to the axial center AX2. With this, the wheel 41 can be positioned on a two-axis basis, and hence external appearance quality can be enhanced.

In addition, the first rotary shaft 31 serves also as a rotary shaft of the first rotary volume 32, and the second rotary shaft 38 serves also as a rotary shaft of the second rotary volume 39. With this, the relative pivot amount of the parent unit 10 and the child unit 30, and the relative pivot amount of the child unit 30 and the grandchild unit 50 can be detected with higher accuracy, and an increase in number of components can be suppressed.

Further, of the components positioned directly around the first axial center AX1 and the second axial center AX2, the cover body 51 and the manipulator 56 that are provided integrally with the grandchild unit 50 each serve as an external appearance member that is exposed to the outside, which is advantageous in maintaining good external appearance. In addition, of the directly positioned components, mechanical components that are engaged dynamically with other components advantageously enable satisfactory mechanical operations. Examples of the mechanical components include the inner thick portion 18 of the large house 12 of the parent unit 10, which drives the first rotary shaft 31 through intermediation of the cutout portion 31b. Similarly, the cover body 51 of the grandchild unit 50 drives the second rotary shaft 38 through intermediation of the cutout portion 38b, and the drive portion 55 drives the coil spring 46. Note that, those components, which are positioned on a two-axis basis, form the units and are provided integrally with each other, but may be conceptually regarded as the units themselves.

Further, the second rotary shaft 38 is inserted through both the shaft insertion hole 56c of the manipulator 56 and the shaft insertion hole 58 of the cover body 51 so as to axially support the manipulator 56 and the cover body 51 directly. Thus, the manipulator 56 and the cover body 51 are positioned with higher accuracy, and a retention mechanism with respect to the second rotary shaft 38 need not be provided in particular. Note that, from the viewpoint of axially supporting the manipulator 56 and the cover body 51 directly, the shaft portion and the hole portion may have a reverse relationship.

Further, a manipulation force of the manipulator 56 is transmitted to the cover body 51 through intermediation of the engagement hole 54 so that the cover body 51 is movable integrally with the manipulator 56. Thus, the manipulator 56 and the cover body 51 can be pivoted integrally with each other without particularly fixing the manipulator 56 and the cover body 51. In addition, firmly fixing means such as bonding is unnecessary. Note that, only from the viewpoint of moving the cover body 51 integrally with the manipulator 56, an engagement relationship therebetween is not limited to the configuration of the engagement hole and the bar member inserted therethrough.

Figure 8:
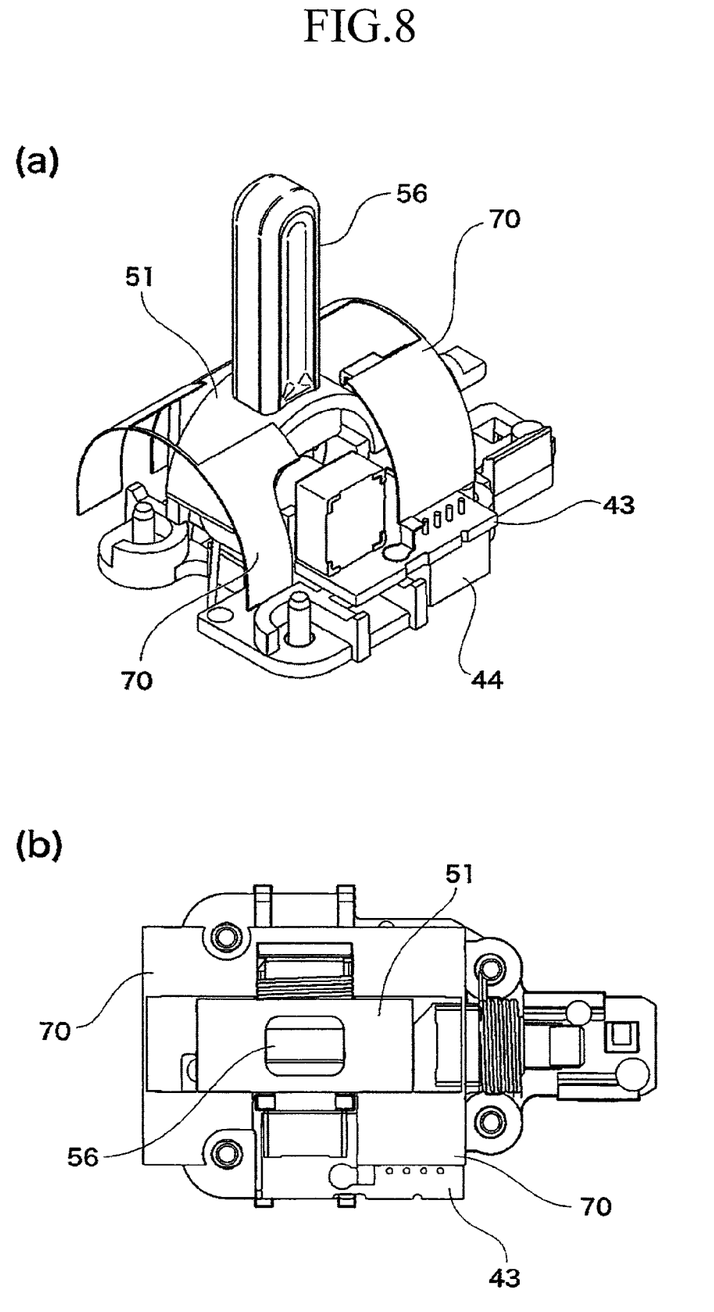
FIG. 8 are a perspective view and a top view of the manipulator device which is provided with a conductive cover, and from which a large house, a small house, a wheel, the upper case, and the like are removed.

By the way, as measures against electromagnetic compatibility (EMC) of the first rotary volume 32 and the second rotary volume 39, it is desired that a conductive cover 70 be provided as illustrated in FIG. 8.

FIGS. 8(a) and 8(b) are a perspective view and a top view of the manipulator device which is provided with the conductive cover 70, and from which the large house 12, the small house 13, the wheel 41, the upper case 11, and the like are removed.

As illustrated in FIGS. 8(a) and 8(b), the conductive cover 70 is fixed by bonding or the like to an inner side of the wheel 41 (FIG. 6), and arranged to be electrically connected to the ground (not shown) of the electrical circuit board 43. Although the conductive cover 70 needs to avoid interference with components, the conductive cover 70 is arranged substantially in conformity with a shape of an inner surface of the wheel 41 so as to collectively cover the first rotary volume 32 and the second rotary volume 39 over as wide a range as possible. The conductive cover 70 is a single member for suppressing mutual interference of electromagnetic waves between the first rotary volume 32 and the outside and between the second rotary volume 39 and the outside. The conductive cover 70 is made of a conductive metal such as aluminum or copper. Measures against electromagnetic waves can be taken with a common and single member, and hence the measures against EMC of the first rotary volume 32 and the second rotary volume 39 can be taken with a simple structure.

Further, as the measures against EMC, it is desired that a filter component such as a ferrite core be interposed in the signal line bundle 45 led out from the connector terminal portion 44.

Note that, the first axial center AX1 and the second axial center AX2 need not necessarily be orthogonal to each other as long as the first axial center AX1 and the second axial center AX2 are non-parallel to each other. Further, a direction in which the engagement hole 54 passes through the cover body 51 need not necessarily be orthogonal to the first axial center AX1 as long as the direction is non-parallel to the first axial center AX1.

Note that, from the viewpoints of integrally grasping the relative pivot references of the three units or positioning the units on a two-axis basis, the first rotary shaft 31 of the first rotary volume 32 and the second rotary shaft 38 of the second rotary volume 39 need not necessarily correspond to relative pivot centers of the units.

The invention claimed is:

1. A manipulator device comprising:
   a first unit;
   a second unit supported by the first unit and configured to be freely pivotable about a first axial center relative to the first unit;
   a third unit, comprising a manipulator, supported by the second unit and configured to be freely pivotable about a second axial center relative to the second unit, the second axial center being non-parallel to the first axial center;
   a first detector configured to detect a pivot amount of the second unit relative to the first unit about the first axial center; and
   a second detector configured to detect a pivot amount of the third unit relative to the second unit about the second axial center,
   wherein the first detector comprises a first rotary volume having a first housing arranged in the second unit and a first rotary shaft projecting from the first housing,
   wherein the second detector comprises a second rotary volume having a second housing arranged in the second unit and a second rotary shaft projecting from the second housing,
   wherein the first rotary shaft is disposed extending along the first axial center, and
   wherein the second rotary shaft is disposed extending along the second axial center.

2. The manipulator device according to claim 1, wherein:
   the manipulator is manipulable to pivot about the first axial center to pivot the second unit about the first axial center with respect to the first unit, and
   the manipulator is manipulable to pivot about the second axial center to pivot the third unit about the second axial center with respect to the second unit.

3. The manipulator device according to claim 1, wherein:
   the first detector is configured to detect a relative rotation amount between the first rotary shaft and the first housing, and
   the second detector is configured to detect a relative rotation amount between the second rotary shaft and the second housing.

4. The manipulator device according to claim 3, further comprising:
   a first pivot portion integral with the second unit and freely pivotable about the first axial center; and
   a second pivot portion integral with the third unit and freely pivotable about the second axial center,
   wherein the first unit supports the second unit so that the second unit freely pivots about the first axial center by supporting the first pivot portion and fixing the first rotary shaft to the first unit so that the first rotary shaft is non-rotatable about the first axial center with respect to the first unit, and
   wherein the second unit supports the third unit so that the third unit freely pivots about the second axial center by supporting the second pivot portion and fixing the second rotary shaft to the third unit so that the second rotary shaft is non-rotatable about the second axial center with respect to the third unit.

5. The manipulator device according to claim 4, wherein:
   the first unit supports the second unit so that the second unit is immovable in the direction of the first axial center, and
   the second unit supports the third unit so that the third unit is immovable in the direction of the second axial center.

6. The manipulator device according to claim 1, further comprising:
   a first spring locked to the first unit and driven by the second unit to apply a force of returning to an initial position to the second unit; and
   a second spring locked to the second unit and driven by the third unit to apply a force of returning to an initial position to the third unit.

7. The manipulator device according to claim 1, wherein the first axial center and the second axial center are orthogonal to each other.

8. The manipulator device according to claim 1, further comprising:
   a common electrical circuit board arranged in the second unit,
   wherein the first housing and the second housing are mounted to the common electrical circuit board.

9. The manipulator device according to claim 8, wherein:
   the common electrical circuit board has an L-shape, and
   the first housing and the second housing are respectively-mounted to the common electrical circuit board with the first and second rotary shafts respectively extending outwardly from the common electrical circuit board.

10. The manipulator device according to claim 9, further comprising a connector terminal portion provided at a bent portion of the L-shape of the common electrical circuit board.

11. The manipulator device according to claim 1, wherein a signal line from the first detector and a signal line from the second detector are bundled into a single signal line bundle, which is led to an outside.

12. The manipulator device according to claim 1, further comprising a conductive cover covering the first and second detectors and provided as measures against EMC of the first and second detectors.

* * * * *